United States Patent [19]

Florence et al.

[11] Patent Number: 4,496,705

[45] Date of Patent: Jan. 29, 1985

[54] SYNTHESIS OF ZWITTERIONIC SILOXANE POLYMERS

[75] Inventors: Robert A. Florence, Scotia; John R. Campbell, Clifton Park; Robert E. Williams, Jr., Scotia, all of N.Y.

[73] Assignee: General Electric Company, Schenectady, N.Y.

[21] Appl. No.: 568,018

[22] Filed: Jan. 4, 1984

[51] Int. Cl.$^3$ ............................................. C08G 77/04
[52] U.S. Cl. ..................................... 528/34; 528/38; 528/26; 528/27; 556/413; 556/424
[58] Field of Search ...................... 528/34, 38, 26, 27; 556/413, 424

[56] References Cited

U.S. PATENT DOCUMENTS 3,849,359  11/1974  Nitzsche et al. ...................... 528/38

OTHER PUBLICATIONS

Litt & Matsuda, J. Polymer Science, vol. 19, p. 1221 (1975).
Graiver et al., J. Polymer Science, Polymer Chem. Ed., vol. 17, pp. 3559–3572, 3573–3636, (1979).

Primary Examiner—Melvyn I. Marquis
Attorney, Agent, or Firm—Richard J. Traverso; James C. Davis, Jr.; James Magee, Jr.

[57] ABSTRACT

A method is provided for producing aminoalkyl-siloxane polymers of a high molecular weight by hydrolyzing a difunctional aminoalkyl-silane prior to incorporation into the siloxane polymer. The high molecular weight siloxane polymers obtained may be converted to zwitterionic siloxane rubbers with excellent engineering properties and integrity.

12 Claims, No Drawings

SYNTHESIS OF ZWITTERIONIC SILOXANE POLYMERS

CROSS-REFERENCE TO RELATED APPLICATIONS

This invention is related to copending applications Ser. Nos. 568,165 and 568,019, assigned to the same assignee as the present invention, all disclosures referenced above are incorporated herein by reference.

BACKGROUND OF THE INVENTION

This invention is related to a method of producing intermediates for zwitterionic siloxane polymers having a controlled polymer structure. More particularly, this invention relates to a method of producing zwitterionic siloxane polymer precursors utilizing hydrolyzed difunctional alkoxysilanes and aryloxysilanes in a polymerization reaction with a hydroxy-terminated siloxane oligomer.

The zwitterions on the siloxane polymers provide ionic cross-linking between the siloxane polymers due to the coulombic forces exerted by the ions. An example of an ionic cross-link which may exist between two siloxane polymer segments is illustrated in the following formula:

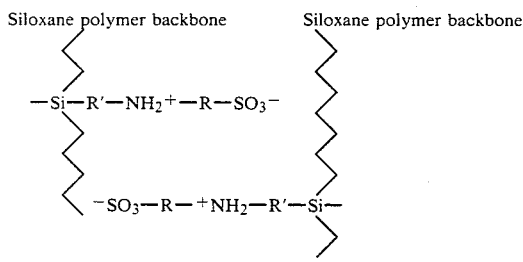

wherein R' is a divalent hydrocarbon radical of from 1 to 20 carbon atoms and R is a divalent hydrocarbon radical of from 2 to 20 carbon atoms.

These cross-links reduce the mobility of the polymer segments and increases their stiffness. For example, polydimethylsiloxanes (DP=500) are typically liquid at room temperature, yet corresponding zwitterionic polysiloxanes are solid rubbers at this temperature. Introducing zwitterions to as few as 1% of the silicone atoms within a siloxane fluid will provide a solid elastomeric material.

These elastomeric materials exhibit high adhesion to glass and other substrates such as, for example, wood, metal, polycarbonates, polystyrene, polyphenylene oxides and blends thereof, etc. The elastomeric properties and adhesive properties of these zwitterionic siloxanes make them suitable for use as adhesives, elastomeric adhesives, sealants, coatings, injection moldable and compression moldable rubbers and plastics, and various silicone based rubbers.

The synthesis of zwitterionic siloxane polymers has been described by Graiver et al. in *J. Polymer Sci.*, Vol. 17, page 3559 (1979). Graiver et al. utilize aminoalkyl-dimethoxysilanes with low molecular weight polydimethylsiloxane oligomers (degree of polymerization, DP, approximately 30). Graiver et al. disclose that successful copolymerization is obtained from these substituents when producing low molecular weight copolymers (DP approximately 500). These low molecular weight copolymers have a lower viscosity than desired and provide poor zwitterionic siloxane rubbers when allowed to react with δ-propane sultone (see Example III).

High molecular weight aminoalkyl-siloxane polymers are difficult to obtain reproducibly from the copolymerization of aminoalkyl-dimethoxysilanes and hydroxy-terminated polydimethylsiloxane oligomers by the method described by Graiver et al. It is difficult to obtain high molecular weight aminoalkyl siloxane polymers where the difunctional aminoalkyl-silane has alkoxy or aryloxy functional groups.

It has been discovered that prehydrolysis of these functional groups of an aminoalkyl-silane provides improved incorporation of said silane into siloxane polymers. Aminoalkyl-siloxane polymers of a high molecular weight are easily obtained from the copolymerization of hydroxy-terminated polydimethylsiloxane oligomers and hydrolyzed aminoalkyl-dimethoxysilanes. Furthermore, it has been discovered that the use of hydroxy-terminated polydimethylsiloxanes of random length provide zwitterionic siloxane polymers with superior properties.

SUMMARY OF THE INVENTION

A method of producing aminoalkyl-siloxane polymers is provided comprising the steps of:

(A) hydrolyzing difunctional aminoalkyl-silane of the formula:

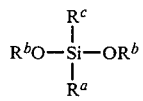

(B) removing a substantial portion of the alcohol coproduct from the hydrolysis reaction mixture of step (A) and (C) polymerizing hydroxy-terminated siloxane oligomers with the aminoalkyl-silane in the remaining hydrolysis reaction mixture of step (B), wherein $R^a$, $R^b$, and $R^c$ are more particularly defined below.

OBJECTS OF THE INVENTION

An object of the present invention is to provide high molecular weight aminoalkyl-siloxane polymers with a high concentration of aminoalkyl radicals incorporated within.

Another object of the present invention is to control the copolymerization of hydroxy-terminated siloxane oligomers with aminoalkyl-silanes to provide a reproducible copolymer product.

Another object of the present invention is to copolymerize hydroxy-terminated siloxane oligomers with aminoalkyl-silanes without inhibition of chain terminating alkoxy or aryloxy groups.

Another object of the present invention is to copolymerize hydroxy-terminated siloxane oligomers of a random length with aminoalkyl-silanes.

DETAILED DESCRIPTION OF THE INVENTION

The objects of the invention and other objects are accomplished by hydrolyzing a difunctional aminoalkyl-silane of the formula:

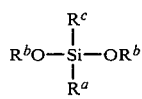

I wherein each $R^b$ is a monovalent hydrocarbon radical independently selected from the group consisting of alkyl radicals of from 1 to 20 carbon atoms and aryl radicals of from 6 to 20 carbon atoms, $R^a$ is an aminoalkyl radical of the general formula:

$$-(R^1-NH)_n-R^2-NH_2$$

wherein $R^1$ and $R^2$ are divalent hydrocarbon radicals selected from the group consisting of alkylene radicals of from 1 to 10 carbon atoms and divalent aryl radicals of from 6 to 20 carbon atoms and n is an integer of from 0 to 5 inclusive; and $R^c$ is a monovalent radical selected from the group consisting of hydrogen, alkyl radicals of from 1 to 20 carbon atoms, aryl radicals of from 6 to 20 carbon atoms and the aminoalkyl radicals within the scope of $R^a$.

The preferred difunctional aminoalkyl-silanes are those wherein each $R^b$ is a methyl radical. Examples of such aminoalkyl-silanes include, N-aminoethyl-γ-aminopropylmethyldimethoxysilane, N-aminoethyl-γ-aminopropylethyldimethoxysilane, N-aminoethyl-γ-aminopropylpropyldimethoxysilane, N-aminoethyl-γ-aminopropylbutyldimethoxysilane, aminopropylmethyldimethoxysilane, aminopropylethyldimethoxysilane, aminopropylbutyldimethoxysilane, aminopropylphenyldimethoxysilane, N-aminoethyl-γ-aminopropylphenyldimethoxysilane, aminoethylmethyldimethoxysilane, aminoethylpropyldimethoxysilane, aminoethylbutyldimethoxysilane, aminoethylphenyldimethoxysilane, etc. The methoxyaminoalkyl-silanes with $R^b$ as a methyl radical are preferred because they are more readily available than the other aryloxy and alkoxy-substituted difunctional aminoalkyl-silanes suitable for use in this invention.

Hydrolysis of the difunctional aminoalkyl-silanes can be accomplished by simply adding water and base or acid to said difunctional aminoalkyl-silanes. Where hydrolysis of all the alkoxy/aryloxy functional groups is desired, two moles of water per mole of silane is required. It is preferable to utilize an excess of water, i.e., in a molar ratio of 10 to 1. The hydrolysis reaction requires an acid or base to catalyze the reaction. Suitable acids include hydrogen chloride, hydrogen bromide, hydrogen fluoride, perchloric, chloric, chlorous, hypochlorous, bromic, carbonic, hypophosphorous, phosphorous, phosphoric, etc. and carboxylic acids such as acetic acid, trifluoroacetic acid, formic acid, propanoic acid, butanoic acid, 2-methyl propanoic acid, pentanoic acid, chloroacetic acid, dichloroacetic acid, trichloroacetic acid, stearic acid, palmitic acid, benzoic acid, phenyl acetic acid, 2-chlorobutanoic acid, 3-chlorobutanoic acid, 4-chlorobutanoic acid, etc. Suitable bases include sodium hydroxide, potassium hydroxide, ammonia, organic amines of the formula $R^4{}_3N$, wherein $R^4$ is hydrogen an alkyl radical selected from the group consisting of 1 to 8 carbon atoms and aryl radicals of from 6 to 20 carbon atoms. The preferred quantity of base or acid utilized to catalyze the hydrolysis reaction falls within the range 0.001 to 0.1 moles per mole of difunctional aminoalkyl-silane. Although concentrations outside of this range will provide hydrolysis, the rate of reaction will be too slow or there will be a waste of acid or base.

The hydrolysis reaction preferably takes place at about room temperature to minimize polymerization of the hydrolyzed aminoalkyl-silanes although higher temperatures are not excluded. The preferred base is potassium hydroxide, which functions well at room temperature.

It may be desirable to only partially hydrolyze the difunctional aminoalkyl-silanes where aminoalkyl-siloxane polymers of a lower molecular weight are desired. Partial hydrolysis can be achieved by interrupting the reaction, utilizing small quantities of water, utilizing small quantities of acid or base catalyst or by utilizing weaker acids or bases. By partially hydrolyzing the difunctional aminoalkyl-silanes, the ability to incorporate the silanes within a siloxane polymer is significantly reduced.

Hydrolysis of alkoxy and aryloxy radicals which appear on the difunctional aminoalkyl-silanes produces alcohols that correspond to the alkoxy and aryloxy radicals. Where the preferred difunctional amino-alkyl-silanes are utilized, methanol is produced from the methoxy groups. Once alcohol is produced, it is necessary to remove a portion of the alcohol to prevent the functional groups (alkoxy and aryloxy) from reforming during polymerization. Permitting the alkoxy or aryloxy groups to reform during polymerization reduces the effectiveness of hydrolyzing the difunctional aminoalkyl-silanes. Where it desired to maximize the chain length of the aminoalkyl-siloxane polymers produced, it is preferable to remove substantially all of the alcohol produced by the hydrolysis reaction. However, where less than the maximum chain length of said aminoalkyl-siloxane polymers is desired, a portion of the alcohol produced may be left within the reaction mixture to reduce the effectiveness of hydrolyzing the difunctional aminoalkyl-silanes.

To remove the alcohol from the reaction mixture a vacuum need only be applied where the alcohol provides a high vapor pressure during the hydrolysis reaction. Where this does not occur, it is necessary to distill the alcohol from the reaction mixture. Conventional equipment can be utilized for either applying a vacuum or distilling the alcohol from the reaction mixture.

Once the desired quantity of alcohol is removed from the reaction mixture, the hydrolyzed aminoalkyl-silane is polymerized with a hydroxy-endcapped siloxane oligomer. Suitable hydroxy endcapped siloxane oligomers include low molecular weight siloxanes exhibiting a degree of polymerization as low as 3 and 4. It is preferable to utilize those hydroxy-endcapped siloxane oligomers having an average degree of polymerization in the range of about 30 to 800. The degree of polymerization may actually be well above 800 and below 30. Oligimer segments in the finished product may have as many as 2000 monomeric units. Such hydroxy-endcapped siloxane oligomers provide highly viscous aminoalkyl-siloxane polymers upon polymerization, which in turn provide solid zwitterionic siloxane rubbers of good quality. Suitable siloxane oligomers may be linear or branched and they may also be copolymers with organic species such as polypropylene and polyphenylene oxide. The more common hydroxy-endcapped siloxane oligomers are those selected from the group of formulas consisting of:

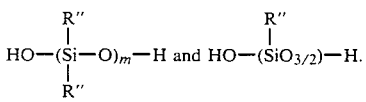

wherein each R'' is independently selected from a group of monovalent radicals consisting of hydrogen, alkyl radicals of from 1 to 8 carbon atoms, aryl radicals of from 6 to 20 carbon atoms and the aminoalkyl radicals of $R^a$ defined above; and m is an integer of from 1 to 800 inclusive. The more common radicals which appear on the silicon atoms include methyl, ethyl, propyl, butyl and phenyl; the most common being methyl. The hydrolyzed aminoalkyl-silanes may also be polymerized with mixtures of siloxane oligomers having different monovalent radicals. Examples of some suitable siloxane oligomers include, polydimethyl-siloxane, polydiphenylsiloxane, polydiethylsiloxane, poly-dibutylsiloxane, polydipropylsiloxane, polymethylphenyl-siloxane, polydimethyl-co-polydiphenylsiloxane, polyethylphenylsiloxane, hexamethyldisiloxane, octa-methyltrisiloxane, etc.

It is preferable to utilize siloxane oligomers of random lengths. The zwitterionic siloxanes obtained from such polymers have their zwitterions randomly distributed on the polymer chain. It is believed this random distribution provides a better opportunity for cross-linking with other polymer chains. The zwitterionic siloxane rubbers obtained from these oligomers have high viscosities and good engineering properties.

The mole ratio of hydroxy end-capped siloxane oligomers to hydrolyzed aminoalkyl-silanes can provide a value within the range of 1,000 to 1. The lower values of the mole ratio (100 and below) are preferred where the hydroxy end-capped siloxanes are of a relatively high molecular weight, i.e. a degree of polymerization of approximately 400 and above.

To control the polymerization reaction, a polymer chain stopper is typically utilized. Any siloxane polymer having trialkyl substituted silicon atoms as end groups may be utilized as a chain stopper. Examples of such chain stoppers include, hexamethyldisiloxane, octamethyltrisiloxane, decamethyl-tetrasiloxane, etc. The quantity of chain stopper preferably provides a molar ratio of siloxane to chain stopper of about 5,000. Suitable molar ratios provide values within the range of about 100 to over 5000. However, the use of a chain stopper is unnecessary to produce aminoalkyl-siloxane polymers from the polymerization reaction.

Polymerization can be achieved by heating the hydroxy-terminated siloxane oligomer with the hydrolysis reaction medium containing aminoalkyl-silane in the presence of water, an acid or base catalyst and optionally an organic solvent. The reaction temperature is preferably maintained within the range of 80° to 120° C. for a period of about 0.25 to 1 hours. Any solvent which dissolves the oligomers is suitable. Suitable solvents include, toluene, benzene, tetrahydrofuran chlorobenzene, dichlorobenzene, etc. Suitable catalysts include the acids and bases utilized as hydrolysis catalysts, such as, acetic acid and KOH.

To polymerize the hydrolyzed silanes with hydroxy-terminated siloxane oligomers of random lengths either a mixture of hydroxy-terminated oligomers is utilized or they are produced in-situ. Producing the hydroxy-terminated siloxane oligomers in-situ is preferred since this provides a higher degree of randomness. To produce these oligomers in-situ a hydroxy-terminated siloxane oligomer or a non-hydroxy-terminated siloxane oligomer is added to the polymerization reaction medium which contains the hydrolyzed silanes, water and catalyst. The hydroxy-termminated and non-hydroxy-terminated siloxane oligomers which are added to the polymerization reaction break down and hydrolyze in the presence of water and acid or base catalyst. It is preferable to add an additional quantity of catalyst and water along with an organic solvent such as those described above. Any cyclic, linear or branched-chain siloxane oligomer can be introduced. Siloxanes having a degree of polymerization. above 5000 are suitable since any siloxane introduced is broken-down and hydrolyzed. The hydroxy-terminated siloxane oligomers obtained are polymerized with the silanes by removal of water from the system.

This invention is not limited by the type of polymerization reaction or conditions utilized.

To prepare the corresponding zwitterionic siloxane polymer from the aminoalkyl-siloxane polymer, the reaction mixture described above is dried to remove substantially all the water, allowed to cool to room temperature, and diluted with an organic solvent. An organo-sultone and/or lactone is added to the reaction mixture which is then placed under a nitrogen atmosphere. The zwitterionic species are formed after about 16 hours and the zwitterionic siloxane rubber is obtained upon removal of the organic solvent from the reaction mixture.

Suitable organo-sultones are of the formula:

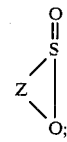

and suitable lactones are of the formula:

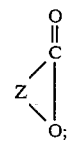

wherein Z is a divalent hydrogen carbon species selected from the group consisting of alkylene radicals of from 3 to 4 carbon atoms and aryl radicals of from 6 to 20 carbon atoms including arylalkyl radicals. The preferred organo-sultone and lactone are γ-propanesultone and γ-propiolactone, respectively. The preferred quantity of organo-sultone and/or lactone utilized is about 1 molar equivalent to the number of amino groups which appear on the siloxane polymer.

The following examples are provided to illustrate the process comprising this invention. These examples are not provided with the intent to limit the scope of this invention to their contents.

EXAMPLE I

This example illustrates the conventional synthesis of zwitterionic siloxane polymers as disclosed by Gravier et al. A polydimethylsilicone fluid (GE product #81979, DP 400, 250 g) was equilibrated to a DP 30-polydimethyl silicone fluid by adding distilled water (2.02 g, 0.112 m) and potassium hydroxide (0.00336 m) catalyst. The mixture was stirred at 90° C. for one hour and became noticeably less viscous.

N-2-Aminoethyl-3-aminopropylmethyldimethoxysilane (14.06 g, 0.068 m, 2.0 mole %) was added to the DP 30 fluid along with decamethyltetrasiloxane (2.14 g, 0.0069 m). The reaction was stirred at 90° C. for 16 hours to insure equilibration of the polymer. By-products of the reaction were removed by distillation, the final pot temperature being 180° C. The reaction catalyst was neutralized by adding sodium bicarbonate (0.00336 m) and stirring for one hour. The mixture was allowed to cool and thereafter diluted with dry toluene (1250 mL) and filtered to remove sodium salts. The toluene solution was then washed with distilled water and the organic phase was collected and concentrated under reduced pressure. A viscous, slightly milky fluid was obtained. This fluid was analyzed by silicone NMR to determine the chain length and the Brookfield viscosity was measured to corroborate the NMR results. These results appear in Table I.

EXAMPLE II

This example demonstrates an embodiment of this invention. N-2-Aminoethyl-3-aminopropylmethyldimethoxysilane (14.06 g, 0.068 m) was pre-hydrolyzed by adding potassium hydroxide (0.1 g) in distilled water (10.0 mL) and applying a vacuum until all methanol was removed. Polydimethylsilicone fluid (GE Product #81979, DP=400,250 g) was added to the 3 L reaction flask, along with dry toluene (1250 mL), distilled water (10 mL) and decamethyltetrasiloxane (2.14 g, 0.0069 m). The reaction mixture was refluxed for 0.5 hour and the water was removed by azeotropic distillation. The clear solution was concentrated by evaporation of toluene under reduced pressure and a viscous milky fluid was obtained. This fluid was analyzed by silicone NMR to determine the chain length and the Brookfield viscosity was measured to corroborate the NMR results. These results appear in Table I.

TABLE I

| | Chain Length of the Aminoalkyl Siloxane Polymer | | | | |
|---|---|---|---|---|---|
| Example | Polymerization Method | **DP (Theory) | DP (Found) | *Silanol | Brookfield Viscosity |
| I | Gravier et al. | 500 | 267 | 41% | 446 centistokes |
| II | Pre-Hydrolysis | 500 | 603 | 10% | 13750 centistokes |

*Percent of hydroxy-end groups (silicone NMR data)
**DP = degree of polymerization

EXPERIMENTAL

A zwitterionic siloxane polymer made from the amino-fluids produced in Examples I and II. The amino-fluids (50.0 g) were dissolved in dry toluene (350 mL) with stirring at room temperature. 1,3-Propane sultone (3.32 g, 0.0272 m) was dissolved in toluene (5.0 mL) and added to the amino-fluid solutions. The reactions were stirred at room temperature under a nitrogen atmosphere for three hours. Active carbon black (0.5 g) was added to the reaction mixture containing the amino fluid of Example I and then filtered. Both reaction mixtures were dried in a vacuum oven at 70° C. for 16 hours. The resulting products were slightly yellow rubbery materials. The zwitterionic siloxane rubber obtained from the aminoalkyl-siloxane precursor of Example I could be broken easily by folding in half. The zwitterionic siloxane rubber obtained from the aminoalkyl-siloxane fluid of Example II was not broken when folded and was easily stretched to several times its length. The engineering properties of both zwitterionic siloxane rubbers were determined and the results appear in Table II.

TABLE II

| Zwitterionic Siloxane Rubber Engineering Properties | | |
|---|---|---|
| Aminoalkyl-siloxane Precursor | Tensile at Break (psi) | % Elongation |
| Example I | 75 | 43 |
| Example II | 440 | 529 |

What is claimed is:
1. A method of producing aminoalkyl-siloxane polymers comprising the steps of:
   (A) hydrolyzing difunctional aminoalkylsilane of the formula

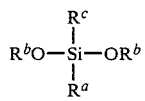

(B) removing a substantial portion of the alcohol coproduct from the hydrolysis reaction mixture of step (A) and
   (C) polymerizing hydroxy-terminated siloxane oligomers with the aminoalkyl-silane in the remaining hydrolysis reaction mixture of step (B); wherein each $R^b$ is a monovalent hydrocarbon radical independently selected from the group consisting of alkyl radicals of from 1 to 20 carbon atoms and aryl radicals of from 6 to 20 carbon atoms, $R^a$ is an aminoalkyl radical of the general formula:

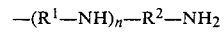

wherein $R^1$ and $R^2$ are divalent hydrocarbon radicals selected from the group consisting of alkylene radicals of from 1 to 10 carbon atoms and divalent aryl radicals of from 6 to 20 carbon atoms and n is an integer of from 0 to 5 inclusive, and $R^c$ is a monovalent radical selected from the group consisting of hydrogen, alkyl radicals of from 1 to 20 carbon atoms, aryl radicals of from 6 to 20 carbon atoms and the aminoalkyl radicals within the scope of $R^a$.

2. A method as in claim 1 wherein the difunctional aminoalkyl-silanes are selected from the group consisting of amino-propyl-methyldimethoxysilane, amino-propyl-ethyldimethoxysilane, and N-2-aminoethyl-δ-aminopropyl-methyldimethoxysilane.

3. A method as in claim 1 wherein the hydroxyterminated siloxane oligomers are of a formula selected from the group consisting of

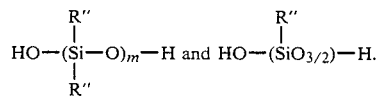

wherein each R″ is a monovalent radical independently selected from the group consisting of alkyl radicals of from 1 to 8 carbon atoms, aryl radicals of from 6 to 20 carbon atoms, and the aminoalkyl radicals, $R^a$, as defined in claim 1; and m is an integer of from 3 to 800.

4. A method as in claim 3 wherein the hydroxy-terminated siloxane oligomers are of a random chain length.

5. A method as in claim 1 wherein the difunctional aminoalkyl-silane is hydrolyzed by the addition of water and a catalytic quantity of base or acid.

6. A method as in claim 4 wherein the quantity of catalyst is within the range of 0.001 to 0.1 moles per mole of difunctional aminoalkyl-silane.

7. A method as in claim 5 wherein the hydrolysis catalyst is selected from the group consisting of hydrogen chloride, hydrogen bromide, hydrogen fluoride, acetic acid, trifluoro acetic acid, formic acid, trichloriacetic acid, butanoic acid, sodium hydroxide, potassium hydroxide, ammonia, and organic amine of the formula $R^4{}_3N$ wherein $R^4$ is a monovalent radical selected from the group consisting of hydrogen, alkyl radical of from 1 to 8 carbon atoms and aryl radicals of from 6 to 20 carbon atoms.

8. A method as in claim 3 wherein the hydroxy-terminated siloxane oligomers are selected from the group consisting of polydimethylsiloxane, polydimethyl-co-diphenyl siloxane and polymethylphenyl siloxane.

9. A method as in claim 1 wherein the polymerization of hydroxy-terminated siloxane oligomers and the aminoalkyl-silanes comprises heating both reactants in the presence of water, a catalytic quantity of base and an organic solvent.

10. A method as in claim 4 wherein said hydroxy-terminated siloxane oligomers of a random chain length are produced within the polymerization reaction medium of step (C) by hydrolyzing the siloxane oligomers added to said polymerization reaction medium.

11. A method as in claim 10 wherein the siloxane oligomers added to said polymerization reaction medium are selected from the group consisting of hydroxy-terminated and non-hydroxy-terminated siloxane oligomers having a degree of polymerization within the range of 3 to 5000.

12. A method as in claim 10 wherein the polymerization of hydroxy-terminated siloxane oligomers and the aminoalkyl-silanes comprises removing water from an admixture comprised of the remaining hydrolysis reaction medium of step (B) and said hydroxy-terminated siloxane oligomers.

* * * * *